Patented June 12, 1945

2,377,914

UNITED STATES PATENT OFFICE 2,377,914

RESIN FROM PETROLEUM

Chester E. Adams, Highland, Ind., assignor to Standard Oil Company, Chicago, Ill., a corporation of Indiana No Drawing. Application June 28, 1941,
Serial No. 400,353

14 Claims. (Cl. 260—82)

This invention relates to a new resinous product and the process of making it. One object of the invention is to provide a fire resistant resinous product suitable for impregnation of fabrics such as the fabrics of airplane wings, etc. in order to render them impervious to moisture and preserve them from decay. Another object of the invention is to provide a light colored, low cost resin from petroleum sources available in large quantities to meet any reasonable demand. Another object of the invention is to provide a process of making such resins from petroleum products by chlorination of selected hydrocarbon material and control the process to prevent decomposition and discoloration of the resinous products. Still another object of the invention is to provide from petroleum, a chlorinated resin having high stability and resistance to hydrolysis.

Chlorinated resins made from petroleum heretofore have commonly suffered from the disadvantage of having a high rate of hydrolysis. On aging or on being subjected to certain conditions of moisture, temperature, or light, such resins tend to liberate chlorine in the form of hydrochloric acid which makes their use objectionable in connection with cellulose fabrics or metals which are destroyed or attacked by acid. It has likewise heretofore been difficult to produce light colored, chlorinated resins from petroleum, the tendency of the petroleum hydrocarbon being to decompose either during chlorination or afterward, often becoming dark brown or black.

I have now discovered a method of making highly chlorinated resins from petroleum by catalytically treating petroleum fractions at high temperature, using for the purpose solid, refractory, heterogeneous catalysts of the metal oxide type, and then subjecting the treated fractions to chlorination under controlled conditions. Hydrocarbons synthesized in the process by catalytic action have molecular weights generally within the range of about 130 to 350. My process will be clearly understood from the following description.

Petroleum distillates, which may be virgin or cracked heavy napthas or gas oil fractions, are vaporized and subjected to the action of solid, refractory catalysts at temperatures within the range of about 800 to 1050° F. By selection of the proper catalysts the heavy naptha is converted largely into high knock rating gasoline and a higher boiling fraction of complex chemical structure resulting from the synthetic action of the catalyst on the lower boiling naphtha hydrocarbons. A typical inspection of this hydrocarbon product is as follows:

| | | |
|---|---|---|
| Gravity—°A. P. I. | | 11.0 |
| Color—N. P. A. | | 5–6 |
| Distillation—A. S. T. M.: | | |
| Initial | °F. | 448 |
| 10% | °F. | 465 |
| 50% | °F. | 490 |
| 90% | °F. | 620 |
| 92% | °F. | 750 |
| Specific dispersion | | 264 |

The specific dispersion referred to is the relation between the refractive index and density and numerically it is the difference between the refractive indices as determined with the alpha line and the beta line of the hydrogen spectrum divided by the density and multiplied by 10,000. Mathematically it may be indicated as follows:

$$\frac{N20/H\beta - N20/H\alpha}{d} \times 10,000$$

Chlorination of this product is effected by passing in chlorine either in the dark or the light. Sunlight may be used or actinic light from artificial sources, e. g., ultraviolet light may be used. Various catalysts may also be employed in the chlorination such as ferric chloride, copper chloride, vanadium chloride, aluminum chloride, iodine, etc.

It is desirable to begin the chlorination at relatively low temperatures and preferably at a temperature below 170° F., for example, at a temperature of 110° F. to 150° F. Cooling may be necessary to maintain the temperature at the desired point because of the exothermic nature of the reaction.

After a certain amount of chlorine has been absorbed at the low temperature, for example, from 1 to 4 atoms per molecule of hydrocarbon, the temperature is then increased gradually to about 300 to 400° F. to increase the rate of chlorination, maintaining a slight excess of chlorine throughout the reaction.

The amount of chlorine introduced will vary with the character of the resin desired and in general from 6 to 10 atoms are employed per molecule of hydrocarbon material. The resin containing 6 atoms of chlorine or less is a soft plastic at ordinary temperatures while resins containing from 8 to 10 atoms of chlorine per molecule are brittle solids.

By carefully controlling the addition of chlorine as just described, light yellow, yellow or light brown resins are obtained whereas by chlorinating at a higher temperature initially, dark colored resins and tars result.

The metal oxide catalysts employed in the high temperature conversion step of my process for preparing the synthetic hydrocarbon material vary considerably with the nature of the petroleum fraction treated and the conditions of the process. Thus, for converting heavy naphthas as above described, I prefer to use dehydrogenating catalysts of the character of the oxides of the metals found in the left column of the Vth and VIth groups of the Periodic system, such as molybdenum oxide, chromium oxide, and vanadium oxide, either alone or associated with other oxides, such as aluminum and magnesium oxides. A suitable catalyst for this operation is about 10% molybdenum oxide deposited on activated alumina, e. g., alumina gel. Vapor velocity is indicated by "space velocity" within the range of about 2 to 10 volumes of oil per hour per apparent volume of catalyst (V. H. V.). In this operation it is desirable to employ hydrogen to maintain catalyst activity. Hydrogen pressures of 50 to 500 pounds per square inch are satisfactory. The reaction, however, is not a hydrogenation reaction under these conditions but instead hydrogen is produced in this step of the process and may be recycled thereto.

When treating gas oil fractions of petroleum, it is desirable to employ cracking catalysts and those catalysts having a base of activated silica or titania are suitable. Thus, alumina or magnesia deposited on silica are quite effective. Activated natural clays, bauxite, etc. may be used also. Thus, activated bentonite (acid treated) is a good conversion catalyst for the treatment of gas oil generally at temperatures of about 850° F. to 950° F. Calcined magnesite intimately mixed with silica gel is very effective in converting gas oil.

Where gas oil is used as the starting material, it is desirable to separate the resulting gasoline from heavier products by distillation and then subject the heavier fractions to selective extraction with solvents to separate the synthesized hydrocarbon products from any unchanged gas oil admixed therewith. Various solvents may be used for this purpose such as furfural, sulfur dioxide, alone or mixed with benzene, acetone, aniline, phenol, nitromethane, etc. The following examples show the results obtained with the nitromethane extract of heavy fractions from catalytic gas oil conversion.

Gas oil was subjected to conversion with an alumina-silica catalyst at 925° F. and liquid products were fractionated into approximately equal fractions of gasoline and higher boiling hydrocarbons. The higher boiling fraction, having a boiling range of about 400° F. to 750° F., was extracted with nitromethane and yielded approximately 25 to 30% of extract after separation of the nitromethane. This extract boiling at about 450° F. to 700° F., was separated by distillation into three fractions:

(1) 450 to 500° F.
(2) 500 to 620° F.
(3) above 620° F.

These fractions were given a preliminary treatment with about 90 to 95% sulfuric acid which removes certain colored constituents. The fractions were then chlorinated separately in the light and without a catalyst, keeping the temperature initially below 150° F. and after partial chlorination raising the temperature gradually to about 300° F. to 350° F. The first fraction was chlorinated to a resin containing about 8 to 9 atoms of chlorine per molecule. The second fraction was chlorinated to about 7 to 8 atoms per molecule. The latter product was a clear, light yellow, brittle resin, having a molecular weight of 451, suitable for waterproofing, for preparing light colored varnishes by compounding with drying oils, etc. The third fraction was chlorinated to a reddish brown, hard, brittle resin containing about 6 to 8 atoms of chlorine per molecule. A somewhat higher rate of chlorination and corresponding higher initial temperature appear to have caused the darker color.

The resins produced in my process are amorphous, clear, glassy substances varying from tacky plastics to brittle solids. They have a low degree of flammability which varies with the chlorine content, the more highly chlorinated resins, for example those having about 8 atoms of chlorine per molecule of chlorinated product, being substantially non-flammable. These resins also impart non-flammability to other products with which they are mixed or associated. As indicated hereinabove, when compounded with drying oils or certain other resins such as the natural gums, gum dammar, copal, etc., high grade varnishes are produced.

My chlorinated resins may also be combined with certain artificial resins such as the phenol formaldehyde, alkyd or styrene resins to render them less flammable and improve other characteristics, such as aging. When compounded with other resins and drying oils, e. g., linseed oil, tung oil, soya oil, etc., they give a varnish film of great homogeneity and resistance to moisture. In addition to the uses indicated, my chlorresins may be chemically combined with materials in the manufacture of other resin and related products by condensation and polymerization reactions. My chlorresins may also be used as such in coating materials such as paints and adhesives.

Although I have described my invention as applied to certain examples, I intend that its breadth be construed in accordance with the following claims.

I claim:

1. In the process of producing light colored, amorphous, clear, glassy, stable chlorinated solid resins from petroleum hydrocarbons wherein said hydrocarbons are subjected to the action of a refractory metal oxide conversion catalyst at a conversion temperature of about 800 to 1050 F. for a time sufficient to effect substantial conversion of said hydrocarbons to synthetic products and said products are subsequently chlorinated to yield resins, the improvement comprising separating from the products of said conversion a fraction having a molecular weight within the range of about 130 to 350 comprised of hydrocarbons synthesized in said conversion operation, and subjecting said fraction to chlorination at 110 to 450° F. sufficient to introduce 6 to 10 atoms of chlorine per molecule of hydrocarbons treated.

2. The process of claim 1 in which said chlorination is initially conducted at a temperature below about 170° F., and the temperature is increased during the chlorination operation.

3. The process of claim 1 wherein at least 2 atoms of chlorine are introduced into said hydrocarbon fraction at a temperature below about 170° F. and the remaining chlorine is introduced at a gradually increasing temperature within the range of 170° F. to 450° F.

4. In the process of producing light colored, amorphous, clear, glassy, stable, solid chlorinated hydrocarbon resins from petroleum wherein a petroleum naphtha is subjected to conversion at a conversion temperature of about 800 to 1050° F. in the presence of a dehydrogenating catalyst and the products are chlorinated to a resin, the improvement comprising separating from the products of said conversion a hydrocarbon fraction boiling mostly outside and above the range of said naphtha and comprised of synthesized hydrocarbons having a molecular weight within the range of about 130 to 350, subjecting said hydrocarbon fraction to chlorination whereby about 6 to 10 atoms of chlorine per molecule are introduced into said hydrocarbon fraction and controlling the temperature of said chlorination in the range of 110–450° F. beginning with a low temperature within this range to produce resinous products of light color.

5. The process of claim 4 wherein said naphtha conversion is conducted in the presence of hydrogen at pressures within the range of about 50 to 500 pounds per square inch.

6. In the method of producing light colored, amorphous, clear, glassy, solid chlorinated hydrocarbon resins from petroleum wherein a gas oil fraction is subjected to the action of a cracking catalyst of the metal oxide type at a conversion temperature of about 800 to 1050° F. and the reaction products are chlorinated to produce a resin, the improvement comprising separating from the products of said reaction a relatively heavy fraction containing unchanged gas oil hydrocarbons and hydrocarbons synthesized in said conversion operation having a molecular weight in the range of 130–350, extracting said fraction with a selective solvent for said synthesized hydrocarbons and converting said synthesized hydrocarbon extract fraction into a resin by introducing thereinto about 6 to 10 atoms of chlorine per molecule at a temperature within the range of 110–450° F., starting the chlorination at a temperature in the lower part of this range and increasing the temperature as the chlorination progresses.

7. The process of claim 6 wherein the extracted synthesized hydrocarbon fraction is given a preliminary treatment with sulfuric acid before chlorination.

8. An amorphous, plastic, light colored, transparent, chlorinated solid resin prepared by chlorinating a catalytically synthesized hydrocarbon fraction having a molecular weight within the range of about 130 to 350 and a specific dispersion of about 264 derived from the catalytic conversion of petroleum, said resin containing from 6 to 10 chlorine atoms per molecule and being characterized by high stability, substantial nonflammability and compatibility with varnish resins and drying oils.

9. In the process of producing light colored amorphous, clear, glassy solid stable chlorinated resins from petroleum oils wherein said oils are subjected to the action of a refractory metal oxide conversion catalyst at conversion temperature approximately within the range of 800° to 1050° F. for a time sufficient to effect substantial conversion of said hydrocarbons and the reaction products are chlorinated to a solid resin, the improvement comprising, separating from the products of said conversion a synthetic hydrocarbon fraction having a molecular weight in the range of about 130 to 350, said fraction being comprised of hydrocarbons synthesized in said conversion operation, chlorinating said fraction at about 110–450° F. to the extent of about 6 to 10 atoms of chlorine per molecule of hydrocarbon treated, said chlorination being initially conducted at a temperature below 170° F., and recovering the resulting chlorinated hydrocarbon resin.

10. The process of claim 9 wherein said chlorinated hydrocarbon resin is obtained in lighter color by introducing at least two atoms of chlorine at a temperature below about 170° F. and then gradually introducing the remaining chlorine within the temperature range of about 170° to 450° F.

11. The process of making light colored stable solid chlorinated hydrocarbon resins which comprises introducing by direct chlorination at about 170° to 450° F. about 6 to 10 atoms of chlorine into a synthetic hydrocarbon fraction having a molecular weight in the range of about 130 to 350 derived from the conversion of hydrocarbon naphtha in the presence of a solid refractory conversion catalyst at a temperature of about 800° to 1050° F., the temperature employed in said chlorination being progressively increased beginning at a low point and ending at a high point within the said temperature range as the chlorination reaction proceeds.

12. The process of claim 11 wherein said synthetic hydrocarbon fraction is characterized by an initial distillation temperature of about 448° F. and a 92% distilled temperature of about 750° F., the specific dispersion of said synthetic fraction being about 264.

13. The process of claim 11 wherein said refractory metal oxide catalyst is molybdenum oxide supported on aluminum oxide.

14. The process of claim 11 wherein said naphtha conversion process is effected in the presence of hydrogen under pressures of about 50 to 500 pounds per square inch.

CHESTER E. ADAMS.